（12）United States Patent
Kawakubo (10) Patent No.: US 9,428,216 B2
(45) Date of Patent: Aug. 30, 2016

(54) RACK BUSH

(71) Applicant: JTEKT CORPORATION, Osaka-shi, Osaka (JP)

(72) Inventor: Akitake Kawakubo, Nara (JP)

(73) Assignee: JTEKT CORPORATION, Osaka-shi (JP)

( * ) Notice: Subject to any disclaimer, the term of this patent is extended or adjusted under 35 U.S.C. 154(b) by 52 days.

(21) Appl. No.: 14/331,684

(22) Filed: Jul. 15, 2014

(65) Prior Publication Data

US 2015/0020618 A1   Jan. 22, 2015

(30) Foreign Application Priority Data

Jul. 22, 2013  (JP) ................ 2013-151833

(51) Int. Cl.
| | | |
|---|---|---|
| *F16H 1/04* | (2006.01) | |
| *B62D 3/12* | (2006.01) | |
| *F16H 19/04* | (2006.01) | |
| *F16H 55/28* | (2006.01) | |
| *F16C 29/02* | (2006.01) | |

(52) U.S. Cl.
CPC ............... *B62D 3/126* (2013.01); *B62D 3/12* (2013.01); *F16H 19/04* (2013.01); *F16H 55/28* (2013.01); *F16C 29/02* (2013.01); *F16H 2055/281* (2013.01); *Y10T 74/18096* (2015.01)

(58) Field of Classification Search
CPC ......... B62D 3/126; B62D 3/12; F16H 55/28; F16H 19/04; F16H 2055/281; F16C 29/02; Y10T 74/18096
USPC .................. 74/422, 29, 388 PS; 180/428
See application file for complete search history.

(56) References Cited

U.S. PATENT DOCUMENTS

| | | | |
|---|---|---|---|
| 6,435,050 B1 | 8/2002 | Tanke, II et al. | |
| 7,665,747 B2* | 2/2010 | Arlt | B62D 3/12 280/93.514 |
| 2009/0166994 A1 | 7/2009 | Span et al. | |
| 2010/0251839 A1* | 10/2010 | Kim | B62D 3/12 74/29 |
| 2011/0016997 A1* | 1/2011 | Oki | B62D 3/12 74/29 |
| 2015/0204381 A1* | 7/2015 | Zaike | F16C 27/063 384/202 |

(Continued)

FOREIGN PATENT DOCUMENTS

| | | |
|---|---|---|
| JP | 2003-322165 A | 11/2003 |
| JP | A-2004-256029 | 9/2004 |

(Continued)

OTHER PUBLICATIONS

Oct. 20, 2014 Search Report and Written Opinion issued in European Application No. 14177602.1.

*Primary Examiner* — William Kelleher
*Assistant Examiner* — Zakaria Elahmadi
(74) *Attorney, Agent, or Firm* — Oliff PLC (57) ABSTRACT

A rack bush, which constitutes a rack and pinion type steering system and supports a rack shaft in which rack teeth are formed at one circumferential portion, includes a bush main body and a rigidity reducing portion. The bush main body has an annular shape into which the rack shaft is inserted. The bush main body is divided, in a circumferential direction, into two portions including a rack teeth-side portion located on the same side as the rack teeth in the circumferential direction and a back face-side portion other than the rack teeth-side portion. The rigidity reducing portion is provided in the rack teeth-side portion, and makes a rigidity of the rack teeth-side portion lower than a rigidity of the back face-side portion.

6 Claims, 5 Drawing Sheets

(56) References Cited

U.S. PATENT DOCUMENTS

2015/0251685 A1* 9/2015 Oda .................. F16C 27/04
                                                             74/422
2015/0274193 A1* 10/2015 Saito .................. B62D 3/126
                                                             74/422

FOREIGN PATENT DOCUMENTS

| JP | A-2008-87535 |   | 4/2008 |
|----|--------------|---|--------|
| JP | 2013-079024 A |   | 5/2013 |
| JP | 2013079024 A | * | 5/2013 |

* cited by examiner

RACK BUSH

INCORPORATION BY REFERENCE

The disclosure of Japanese Patent Application No. 2013-151833 filed on Jul. 22, 2013 including the specification, drawings and abstract is incorporated herein by reference in its entirety.

BACKGROUND OF THE INVENTION

1. Field of the Invention

The invention relates to a rack bush in a rack and pinion type steering system.

2. Description of Related Art

A steering system in Japanese Patent Application Publication No. 2008-87535 (JP2008-87535A) includes a steering mechanism. The steering mechanism is constituted by a rack and pinion mechanism, and steers steered wheels using a steering torque from a steering shaft. The steering mechanism includes a pinion shaft, a rack shaft, a rack housing, and a tubular rack bush. The pinion shaft has pinion teeth. The rack shaft has rack teeth that engage with the pinion teeth. The rack housing supports the pinion shaft and the rack shaft. The rack bush is held in a holding hole of the rack housing. The rack bush supports the rack shaft so that the rack shaft is slidable in an axial direction thereof.

Japanese Patent Application Publication No. 2004-256029 (JP2004-256029A) describes a rack bush in which a plurality of projections is formed on an inner peripheral surface to inhibit abnormal noise caused by backlash. The rack bush supports the rack shaft through the projections without causing any backlash, and the rack shaft is in point contact with the projections.

The rack bush included in the steering system in JP2008-87535A is interposed between the rack housing and the rack shaft. Therefore, when the rack bush is attached to the rack housing, it is necessary to insert the rack bush into the holding hole while contracting the rack bush so that the diameter of the rack bush is decreased. Therefore, it might be difficult to attach the rack bush to the rack housing depending on a dimensional relation between the rack bush and the holding hole, and a rigidity of the rack bush. In the rack bush in JP2004-256029A, an area of contact between the rack shaft and the projections of the rack bush is small. Therefore, the backlash may occur between the pinion shaft and the rack shaft due to, for example, wear of the projections, and the engagement of the pinion teeth with the rack teeth may be weakened.

SUMMARY OF THE INVENTION

An object of the present invention is to provide a rack bush that allows pinion teeth and rack teeth to firmly engage with each other while the rack bush is easily and reliably attached to a housing.

An aspect of the present invention relates to a rack bush constituting a rack and pinion type steering system and supporting a rack shaft in which rack teeth are formed at one circumferential portion. The rack bush includes: an annular bush main body into which the rack shaft is inserted, and which is divided, in a circumferential direction, into two portions including a rack teeth-side portion located on the same side as the rack teeth in the circumferential direction and a back face-side portion other than the rack teeth-side portion; and a rigidity reducing portion that is provided in the rack teeth-side portion, and that makes a rigidity of the rack teeth-side portion lower than a rigidity of the back face-side portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
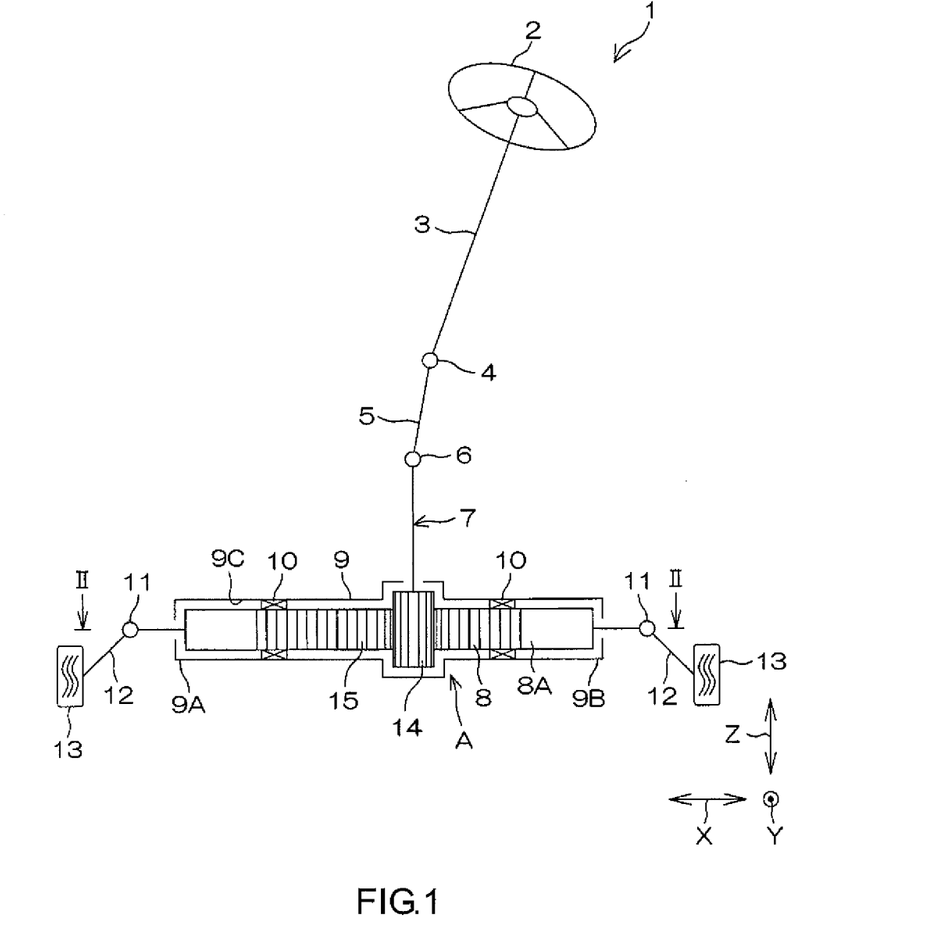
FIG. 1 is a schematic front view of a steering system according to an embodiment of the present invention.

Hereinafter, embodiments of the present invention will be described in detail with reference to the accompanying drawings. FIG. 1 is a schematic front view of a steering system 1 according to an embodiment of the present invention. Referring to FIG. 1, the steering system 1 mainly includes a steering member 2, a steering shaft 3, a universal joint 4, an intermediate shaft 5, a universal joint 6, a pinion shaft 7, a rack shaft 8, and a housing 9.

As the steering member 2, for example, a steering wheel can be used. One end of the steering shaft 3 is connected to the steering member 2. The other end of the steering shaft 3 is connected to one end of the intermediate shaft 5 by the universal joint 4. Furthermore, the other end of the intermediate shaft 5 is connected to one end of the pinion shaft 7 by the universal joint 6. The steering shaft 3, the intermediate shaft 5 and the pinion shaft 7 are not present on the same straight line.

Pinion teeth 14 are integrally provided on an outer peripheral surface of the other end of the pinion shaft 7. The rack shaft 8 has a substantially columnar shape extending in a width direction of a vehicle (a right-left direction of FIG. 1). Rack teeth 15 that engage with the pinion teeth 14 are formed at one circumferential portion of an outer peripheral surface 8A of the rack shaft 8. The pinion teeth 14 of the pinion shaft 7 and the rack teeth 15 of the rack shaft 8 engage with each other to constitute a rack and pinion type steered mechanism A. The rack shaft 8 is accommodated in the housing 9, both end portions of the rack shaft 8 project toward both sides of the housing 9, respectively, and the end portions of the rack shaft 8 are joined to tie rods 12 via joints 11, respectively. Each of the tie rods 12 is connected to a corresponding steered wheel 13 via a corresponding knuckle arm (not shown).

When the steering member 2 is operated, and thus the steering shaft 3 is rotated, this rotation is converted to a linear movement of the rack shaft 8 along an axial direction X by the pinion teeth 14 and the rack teeth 15. Thus, the steered wheels 13 are steered. In this way, the rack shaft 8 moves in the axial direction X in accordance with the steering operation of the steering member 2, whereby the steered wheels 13 are steered.

Here, a direction in which the rack shaft 8 extends is the axial direction X, a direction extending toward a paper surface of FIG. 1 among directions perpendicular to the axial direction X is a front-rear direction Y, and a direction extending upward and downward in FIG. 1 among the directions perpendicular to the axial direction X is an upward-downward direction Z. The axial direction X is the same as the width direction of the vehicle (the right-left direction of FIG. 1). Furthermore, the front-rear direction Y is the same as a longitudinal direction of the vehicle. Furthermore, the upward-downward direction Z is substantially the same as an upward-downward direction of the vehicle. Furthermore, a front side of the paper surface in the front-rear direction Y is a front side of the vehicle, and an inner side of the paper surface in the front-rear direction Y is a rear side of the vehicle.

The housing 9 is a substantially cylindrical body fixed to a vehicle body. The housing 9 accommodates the rack shaft 8 so that the rack shaft 8 is able to linearly reciprocate along the axial direction X. The housing 9 is disposed in a manner such that there is a space between the rack shaft 8 and the housing 9 in a radial direction of the rack shaft 8. The housing 9 includes one end portion (a left end portion in the axial direction X in FIG. 1) 9A and the other end portion (a right end portion in the axial direction X in FIG. 1) 9B. Rack bushes 10 according to this embodiment are respectively disposed in a space between the one end portion 9A of the housing 9 and the pinion teeth 14 and a space between the other end portion 9B and the pinion teeth 14. The rack bushes 10 support the rack shaft 8 so that the rack shaft is movable in the axial direction X. A hollow portion of the housing 9 is defined by a cylindrical inner peripheral surface 9C extending in the axial direction X. The rack shaft 8 accommodated in the housing 9 is coaxial with the inner peripheral surface 9C of the housing 9.

Figure 2:
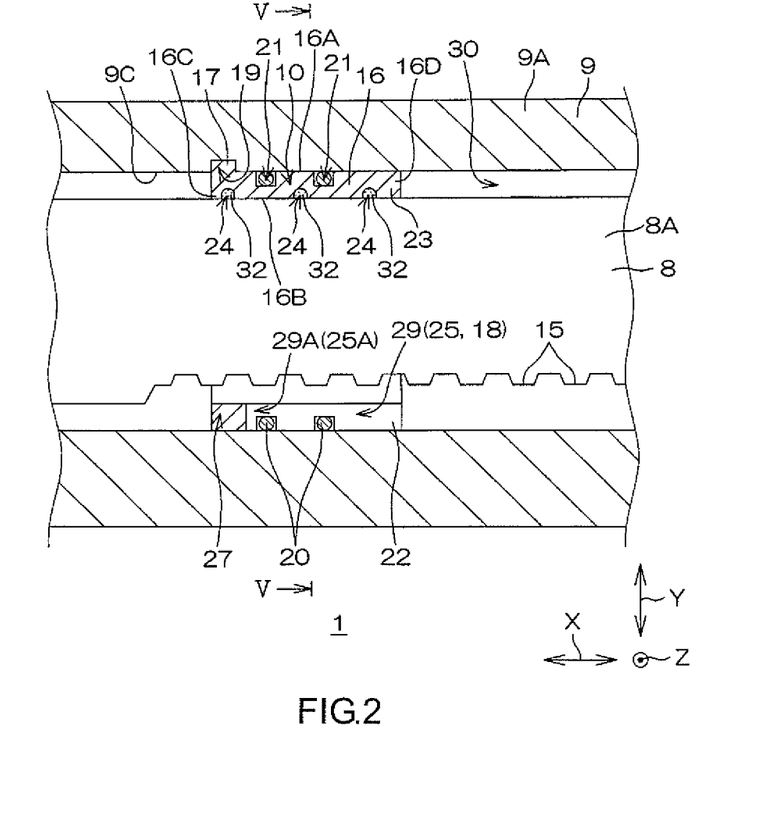
FIG. 2 is a sectional view of a main portion seen in a direction along a II-II line of FIG. 1.

FIG. 2 is a sectional view seen in a direction along a II-II line in FIG. 1. A direction perpendicular to a paper surface of FIG. 2 coincides with the upward-downward direction Z in FIG. 1. Furthermore, a direction extending upward and downward in FIG. 2 coincides with the front-rear direction Y. A direction extending in the right-left direction in FIG. 2 coincides with the axial direction X. Furthermore, FIG. 2 shows the one end portion 9A-side of the housing 9. Hereinafter, only members in the one end portion 9A-side of the housing 9 will be described. Members in the other end portion 9B-side have a configuration symmetric to a configuration of the members in the one end portion 9A-side, with respect to a center of the vehicle in the width direction (the axial direction X). In FIG. 2, the rack shaft 8 is shown without using a cross section thereof.

Hereinafter, the description will be made with reference to FIG. 2 in addition to FIG. 1. Referring to FIG. 2, the rack bush 10 includes a bush main body 16, an engaging portion 17, and elastic members 20. The bush main body 16 has an annular shape extending in the axial direction X. The rack shaft 8 is coaxially inserted into a hollow portion of the bush main body 16. Furthermore, the bush main body 16 is accommodated in the housing 9. In other words, the bush main body 16 (the rack bush 10) is disposed in a space 30 between the outer peripheral surface 8A of the rack shaft 8 and the inner peripheral surface 9C of the housing 9. The space 30 has an annular shape that is defined by the inner peripheral surface 9C of the housing 9 from the outside, and surrounds the rack shaft 8, when seen in the axial direction X. In this state, an outer peripheral surface 16A of the bush main body 16 is in surface contact with the inner peripheral surface 9C of the housing 9, along the entire circumference. An inner peripheral surface 16B of the bush main body 16 is in surface contact with the outer peripheral surface 8A of the rack shaft 8, along the entire circumference. A cross section, which is obtained by cutting, along a direction perpendicular to the axial direction X, a portion in which the rack teeth 15 are formed in the rack shaft 8, has a circular shape in which one circumferential portion at the rack teeth 15 is chipped (i.e., a D-shape) when seen in the axial direction X. That is, one circumferential portion of the rack shaft 8 is flat, and the rack teeth 15 are formed in this flat portion. On the other hand, the inner peripheral surface 16B of the rack bush 10 has a substantially round shape. Therefore, the inner peripheral surface 16B of the bush main body 16 is not in contact with the flat portion in which the rack teeth 15 are formed (a lower portion in FIG. 2) in the outer peripheral surface 8A of the rack shaft 8, and is disposed away from the flat portion toward the outside in the radial direction (also see after-mentioned FIG. 5).

Figure 3:
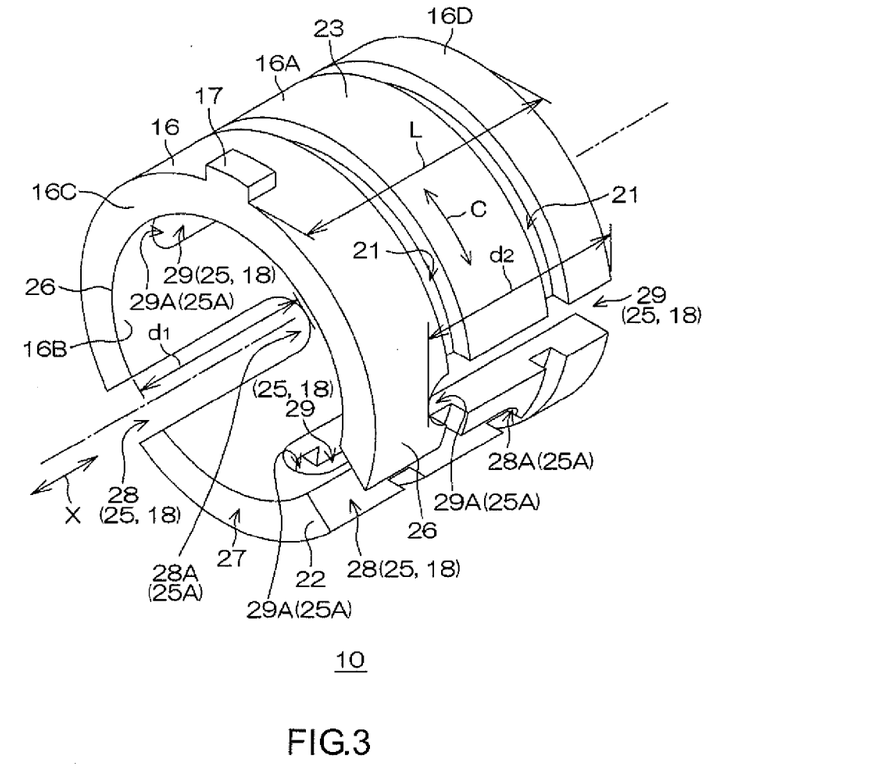
FIG. 3 is a perspective view of a rack bush.
Figure 4:
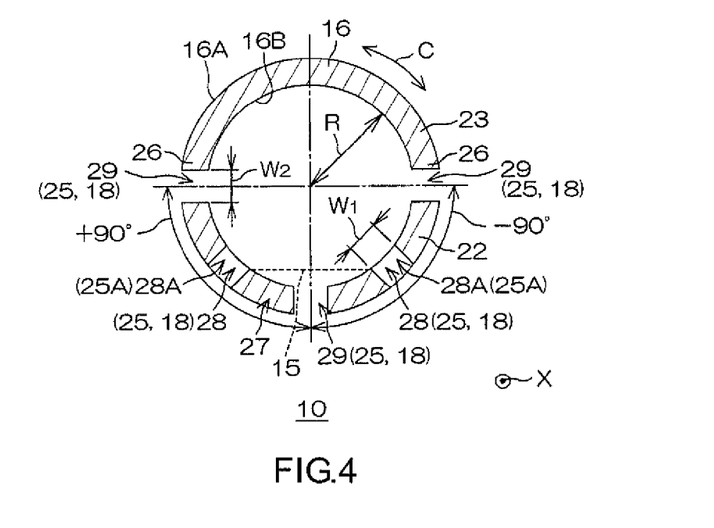
FIG. 4 is a view showing only the rack bush in a section taken along a V-V line in FIG. 2.

FIG. 3 is a perspective view of the rack bush 10. FIG. 4 is a view showing only the rack bush 10 in a section taken along a V-V line in FIG. 2. In FIG. 3, the axial direction X extends from a left front side toward a right inner side. The rack bush 10 in FIG. 3 is disposed in such a posture that an end portion 16C on the left side in FIG. 2 (on the left side of the vehicle in FIG. 1) is directed toward the left front side. A direction perpendicular to a paper surface of FIG. 4 coincides with the axial direction X. An upward-downward direction in the paper surface of FIG. 4 substantially coincides with an upward-downward direction in a paper surface of FIG. 3. The rack bush 10 in FIG. 4 is disposed in such a posture that the end portion 16C (see FIG. 3) is directed toward the front side of the paper surface.

Hereinafter, the description will be made with reference to FIG. 3 and FIG. 4 in addition to FIG. 1 and FIG. 2. Referring to FIG. 3, a circumferential direction of each of the outer peripheral surface 16A and the inner peripheral surface 16B of the bush main body 16 is denoted by a symbol "C". Further, a radial direction of each of the outer peripheral surface 16A and the inner peripheral surface 16B is denoted by a symbol "R" (see also FIG. 4). The annular bush main body 16 is divided into two portions in the circumferential direction C, and each of the two portions is defined. Specifically, on the basis of the rack teeth 15 of the rack shaft 8, the portion (one of the two portions) on the same side as the rack teeth 15 in the circumferential direction C is referred to as a rack teeth-side portion 22. The portion other than the rack teeth-side portion 22 (the other portion of the two portions) is referred to as a back face-side portion 23 (see also FIG. 2). Referring to FIG. 4, the rack teeth-side portion 22 and the back face-side portion 23 are separated at positions that face each other in the radial direction R so as to be parallel to the rack teeth 15 (strictly, a central position in the circumferential direction C, and this also applies to the following). In the bush main body 16, the positions at which the rack teeth-side portion 22 and the back face-side portion 23 are separated in the circumferential direction C are referred to as boundaries 26. The boundaries 26 are positioned at two circumferential portions in the bush main body 16, the two circumferential portions facing each other in the radial direction R so as to be parallel to the rack teeth 15. The rack teeth-side portion 22 and the back face-side portion 23 are conceptually separated, and are not physically separated. In FIG. 2 to FIG. 4, the rack teeth-side portion 22 is positioned in the lower side of the paper surface, and the back face-side portion 23 is positioned in the upper side of the paper surface.

Referring to FIG. 2 and FIG. 3, the engaging portion 17 is a lug-shaped projection projecting outwardly in the radial direction R from the outer peripheral surface 16A at the end portion 16C of the bush main body 16. In the present embodiment, the engaging portion 17 is disposed in the center of the circumferential direction C, in the back face-side portion 23. In the inner peripheral surface 9C of the housing 9, an engagement hole 19 is formed in a portion corresponding to the engaging portion 17. The engaging portion 17 is engaged with the engagement hole 19. Thus, the rack bush 10 is positioned in the housing 9 in the axial direction X and the circumferential direction C.

Each of the elastic members 20 is an annular member, for example, an O-ring. The elastic members 20 are engaged with engagement grooves 21 formed in the bush main body 16. The engagement grooves 21 are grooves recessed inwardly in the radial direction R from the outer peripheral surface 16A of the bush main body 16. The engagement grooves 21 are formed along the entire circumference in the circumferential direction C. The elastic members 20 are fitted into the engagement grooves 21 from the outside in the radial direction R, and hence fitted to the bush main body 16 from the outside (see FIG. 2). One elastic member 20 and one engagement groove 21 may be provided, or a plurality of elastic members 20 (two elastic members in the present embodiment) and a plurality of engagement grooves 21 (two engagement grooves in the present embodiment) may be provided at interval(s) in the axial direction X. In this state, the elastic members 20 elastically contact the inner peripheral surface 9C of the housing 9. That is, the outer peripheral surface 16A of the bush main body 16 contacts the inner peripheral surface 9C of the housing 9 through the elastic members 20. The outer peripheral surface 16A of the bush main body 16 may directly contact the inner peripheral surface 9C of the housing 9.

When the rack bush 10 is disposed in the space 30, it is laborious to attach the rack bush 10 to the housing 9 so that the engaging portion 17 is fitted into the engagement hole 19 while bending the entire rack bush 10 toward the inside in the radial direction R. Therefore, as shown in FIG. 3, a plurality of (five in the present embodiment) axial grooves 25 extending in the axial direction X is provided at equal intervals in the circumferential direction C, in the rack teeth-side portion 22 of the bush main body 16.

Each of the axial grooves 25 extends through the bush main body 16 in the radial direction R. Each of the axial grooves 25 does not extend through the bush main body 16 in the axial direction X, and extends to an intermediate position (an intermediate position in the axial direction X) in the bush main body 16 (the rack teeth-side portion 22). An tip 25A of each of the axial grooves 25 (a portion at the intermediate position in the bush main body 16) is rounded to have a curved shape.

The axial grooves 25 formed in the rack teeth-side portion 22 in this manner function as rigidity reducing portions 18 provided in the rack teeth-side portion 22 to make a rigidity of the rack teeth-side portion 22 lower than a rigidity of the back face-side portion 23. Thus, it is possible to dispose the rigidity reducing portions 18 in the bush main body 16, simultaneously with the formation of the rack bush 10. Therefore, it is possible to reduce the cost. In the present embodiment, one axial groove 25 is provided at each of the positions that face each other in the radial direction R so as to be parallel to the rack teeth 15 (see FIG. 4). That is, two of the five axial grooves 25 in the present embodiment are respectively provided at the boundaries 26 (two circumferential portions) between the rack teeth-side portion 22 and the back face-side portion 23 in the bush main body 16 (also see FIG. 4).

The remaining three axial grooves 25 are provided between the boundaries 26, i.e., in a region 27 other than boundaries 26 in the rack teeth-side portion 22 (also see FIG. 4). Since the axial grooves 25 are provided in the rack teeth-side portion 22 in this manner, the rigidity of the back face-side portion 23 and the rigidity of the rack teeth-side portion 22 are made different from each other. By employing the above-described layout of the axial grooves 25, it is possible to reliably make the rigidity of the rack teeth-side portion 22 lower than the rigidity of the back face-side portion 23.

An end portion of the bush main body 16 that is opposite to the end portion 16C in the axial direction X is denoted by a symbol "16D". The axial grooves 25 include first axial grooves 28 and second axial grooves 29. The first axial grooves 28 are formed to be recessed from the end portion 16C-side of the bush main body 16. The second axial grooves 29 are formed to be recessed from the end portion 16D-side of the bush main body 16. That is, each of the axial grooves 25 extends from the end portion 16C (one end) or the end portion 16D (the other end) of the rack teeth-side portion 22 in the axial direction X to the intermediate position in the rack teeth-side portion 22.

In the present embodiment, the first axial grooves 28 and the second axial grooves 29 are alternately arranged in the circumferential direction C. That is, the two axial grooves 25 adjacent to each other in the circumferential direction C extend from the sides opposite to each other in the axial direction X, to the intermediate positions in the rack teeth-side portion 22. A width w1 of the first axial groove 28 in the circumferential direction C is equal to a width w2 of the second axial groove 29 in the circumferential direction C (see FIG. 4). A depth d1 that is a dimension of the first axial groove 28 in the axial direction X is equal to a depth d2 of the second axial groove 29 in the axial direction X.

The tip 25A of the axial groove 25 formed to extend from one end portion of the bush main body 16 in the axial direction X is positioned on the other side with respect to the center of the bush main body 16 in the axial direction X. Specifically, a tip 28A of the first axial groove 28 is positioned on the end portion 16D-side with respect to the center of the bush main body 16 in the axial direction X. A tip 29A of the second axial groove 29 is positioned on the end portion 16C-side with respect to the center of the bush main body 16 in the axial direction X. That is, each of the depths d1 and d2 is larger than a half of a length L of the bush main body 16 in the axial direction X. Therefore, the bush main body 16 has a shape (a crank shape) in which portions are connected in a zigzag manner, as seen in the radial direction R.

Figure 5:
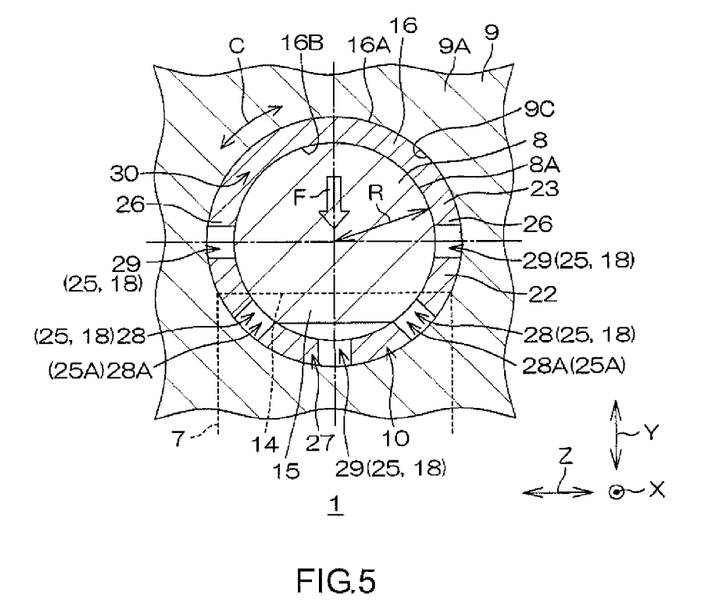
FIG. 5 is a sectional view of the steering system taken along the V-V line in FIG. 2.

In the present embodiment, the two axial grooves 25 provided at the boundaries 26 at the two circumferential portions extend from the same side to the intermediate position in the rack teeth-side portion 22. FIG. 5 is a sectional view of the steering system 1 taken along the V-V line in FIG. 2. In FIG. 5, a direction perpendicular to a paper surface coincides with the axial direction X. In FIG. 5, an upward-downward direction of the paper surface coincides with the front-rear direction Y. In FIG. 5, a right-left direction of the paper surface coincides with the upward-downward direction Z. A posture of the rack bush 10 in FIG. 5 substantially coincides with a posture in FIG. 4.

Hereinafter, the description will be made with reference to FIG. 5 in addition to FIG. 1 to FIG. 4. As described above, the axial grooves 25 are provided in the rack teeth-side portion 22, and the axial grooves 25 are not provided in the back face-side portion 23. Therefore, the rigidity of the rack teeth-side portion 22 is lower than the rigidity of the back face-side portion 23. Thus, the rack teeth-side portion 22 can be bent toward the inside in the radial direction R. On the other hand, the back face-side portion 23 is not bent as easily as the rack teeth-side portion 22. Therefore, by bending the rack teeth-side portion 22 having a relatively low rigidity, it is possible to smoothly insert the rack bush 10 into the hollow portion of the housing 9, and to easily attach the rack bush 10 to the steering system 1.

Referring to FIG. 5, the inner peripheral surface 16B of the bush main body 16 contacts the outer peripheral surface 8A of the rack shaft 8 in a state where the rack bush 10 is attached to the steering system 1. In this state, a restoring force of the elastic members 20 due to elastic deformation is transmitted from the inner peripheral surface 16B of the bush main body 16 to the rack shaft 8 as a reaction force of the bush main body 16 toward the rack shaft 8. The axial grooves 25 are provided in the rack teeth-side portion 22. Therefore, a contact area of the rack teeth-side portion 22, which contacts the rack shaft 8, is smaller than a contact area of the back face-side portion 23, which contacts the rack shaft 8.

On the other hand, after the rack bush 10 is attached to the steering system 1, the rack shaft 8 receives a relatively large reaction force from the back face-side portion 23 having a relatively high rigidity, and receives a relatively small reaction force from the rack teeth-side portion 22 having a relatively low rigidity. Therefore, due to a difference between the reaction force from the back face-side portion 23 and the reaction force from the rack teeth-side portion 22, an urging force F (a preload) acts upon the rack shaft 8 to urge the rack teeth 15 in a direction from the back face-side portion 23 toward the rack teeth-side portion 22 (i.e., a direction in which the rack teeth 15 come close to the pinion teeth 14 of the pinion shaft 7 constituting the rack and pinion mechanism). Accordingly, the rack teeth 15 are allowed to firmly engage with the pinion teeth 14 of the pinion shaft 7.

Thus, the pinion teeth 14 and the rack teeth 15 are allowed to firmly engage with each other while the rack bush 10 is reliably attached to the rack shaft 8. Thus, it is possible to prevent contact noise (rattling noise) of the rack bush 10 and the rack shaft 8. Furthermore, even when the steered wheel 13 runs onto a curbstone or the like and accordingly a large external force acts upon the rack shaft 8, it is possible to maintain the engagement of the pinion teeth 14 with the rack teeth 15.

When the boundaries 26 at the two circumferential portions face each other in the radial direction R so as to be parallel to the rack teeth 15, the urging force F acting upon the rack shaft 8 is perpendicular to the rack teeth 15. Therefore, the pinion teeth 14 can be further firmly engaged with the rack teeth 15. Thus, by making the rigidity of the rack teeth-side portion 22 as low as possible, and making the rigidity of the back face-side portion 23 as high as possible, it is possible to constitute the rack bush 10 that can easily transmit the reaction force of the elastic members 20 to the rack shaft 8.

Referring to FIG. 2, on the other hand, in the back face-side portion 23, a plurality of holes 24 recessed toward the outside in the radial direction R is formed in the inner peripheral surface 16B of the bush main body 16. The holes 24 are recessed portions (so-called ball indents) having a circular shape as seen from the inside in the radial direction R, and are recessed in a semispherical shape toward the outside in the radial direction R. The holes 24 are discretely arranged in a predetermined pattern such as a zigzag pattern in the entire region in the circumferential direction C and the axial direction X. In the present embodiment, six rows of the holes 24 are arranged in the axial direction X, and all the holes 24 are arranged in the zigzag pattern. Therefore, in a section of one circumferential portion in FIG. 2, only three rows are shown.

When a user drives the vehicle, the rack shaft 8 reciprocates in the axial direction X many times. The inner peripheral surface 16B of the bush main body 16 (excluding portions in which the holes 24 are formed) is in surface contact with the outer peripheral surface 8A of the rack shaft 8. Furthermore, a movement of the rack bush 10 in the axial direction X is restricted by the above-described engagement of the engaging portion 17 of the rack bush 10 with the engagement hole 19 of the housing 9. Therefore, the inner peripheral surface 16B frictionally slides on the rack shaft 8, every time the rack shaft 8 moves. Thus, in the back face-side portion 23, a lubricant 32 (dotted portions in the drawings) for decreasing a sliding resistance, for example, a grease is applied to the inner peripheral surface 16B of the bush main body 16, whereby it is possible to reduce the friction due to the sliding friction. Furthermore, the lubricant 32 between the rack bush 10 and the rack shaft 8 is held in the respective holes 24.

Figure 6:
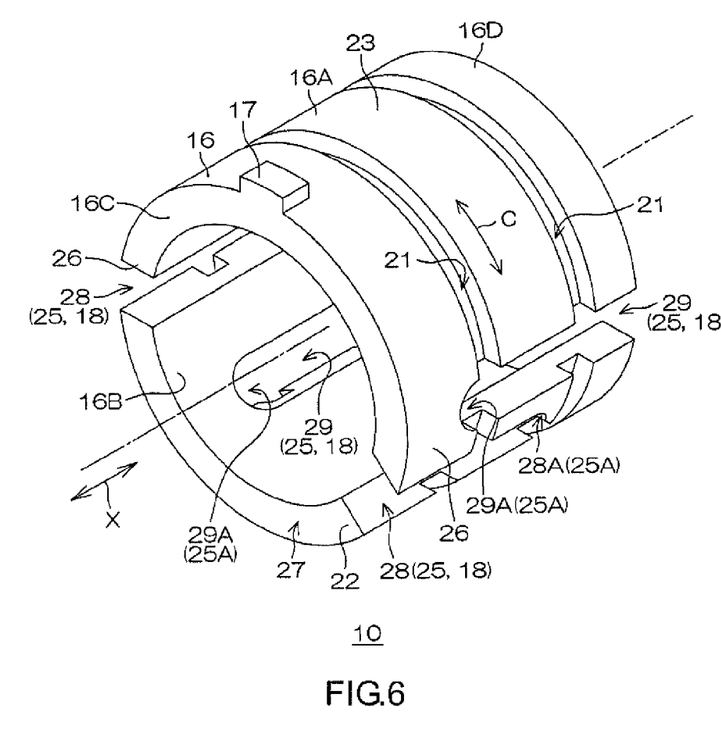
FIG. 6 is a view in which a first modified embodiment of the present invention is applied to FIG. 3.

Next, a first modified embodiment of the present invention will be described. FIG. 6 is a view in which the first modified embodiment of the present invention is applied to FIG. 3. A posture in FIG. 6 coincides with the posture in FIG. 3. The same members as the above-described members will be denoted by the same reference symbols, and the description thereof will be omitted. Hereinafter, the description will be made with reference to FIG. 6 in addition to FIG. 1 to FIG. 5.

Axial grooves 25 in the first modified embodiment are provided at four portions of a bush main body 16 in a circumferential direction C, and hence the grooves are four axial grooves in total. In the first modified embodiment as well as in the embodiment, one axial groove 25 is provided at each of positions that face each other in a radial direction R so as to be parallel to rack teeth 15. That is, the two axial grooves 25 are respectively provided at boundaries 26 (two circumferential portions) between a rack teeth-side portion 22 and a back face-side portion 23 in the bush main body 16.

The remaining two axial grooves 25 are provided between the boundaries 26 (i.e., in a region 27 on the rack teeth 15-side) in the bush main body 16. In the first modified embodiment as well, first axial grooves 28 and second axial groove 29 are alternately arranged in the circumferential direction C. That is, the two axial grooves 25 adjacent to each other in the circumferential direction C extend from sides opposite to each other in an axial direction X, to intermediate positions in the rack teeth-side portion 22.

The axial grooves 25 in the first modified embodiment are the four axial grooves in total. Thus, the two axial grooves 25 provided at the boundaries 26 at the two circumferential portions extend from the sides opposite to each other to the intermediate positions in the rack teeth-side portion 22.

Figure 7:
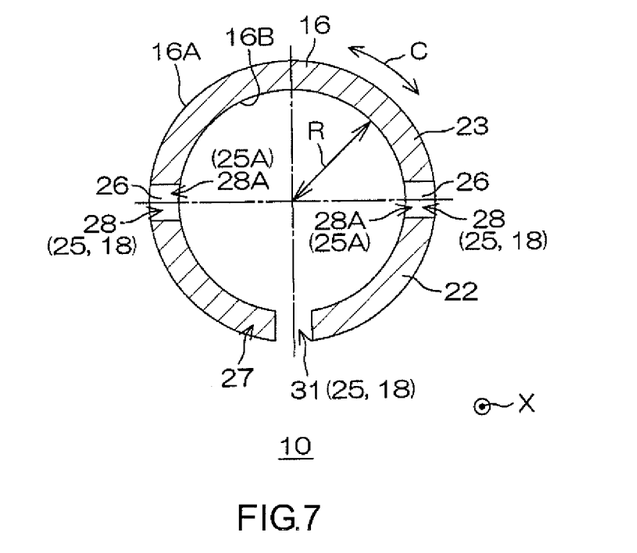
FIG. 7 is a view in which a second modified embodiment of the present invention is applied to FIG. 4.
Figure 8:
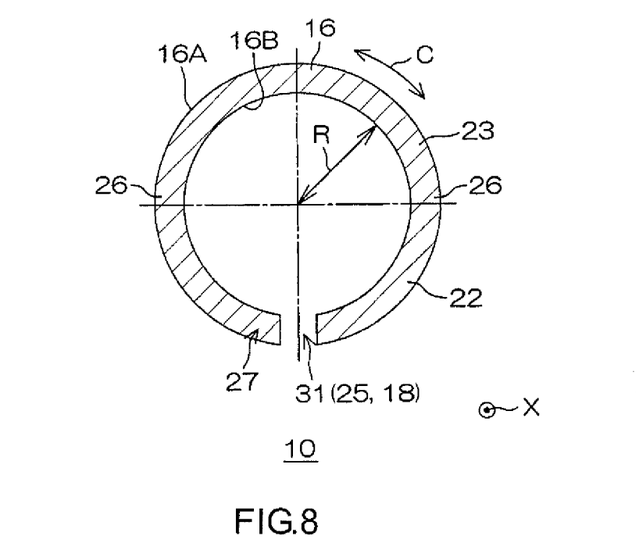
FIG. 8 is a view in which a third modified embodiment of the present invention is applied to FIG. 4.

Next, a second modified embodiment and a third modified embodiment of the present invention will be described. FIG. 7 is a view in which the second modified embodiment of the present invention is applied to FIG. 4. FIG. 8 is a view in which the third modified embodiment of the present invention is applied to FIG. 4. Postures in FIG. 7 and FIG. 8 coincide with the posture in FIG. 4. The same members as the above-described members will be denoted by the same reference symbols, and the description thereof will be omitted.

Hereinafter, the description will be made with reference to FIG. 7 and FIG. 8 in addition to FIG. 1 to FIG. 6. Referring to FIG. 7, in a bush main body 16 in the second modified embodiment, three axial grooves 25 are arranged in a circumferential direction C. In the first modified embodiment as well as in the embodiment, one axial groove 25 is provided at each of positions that face each other in a radial direction R so as to be parallel to rack teeth 15. That is, the two axial grooves 25 are respectively provided at boundaries 26 (two circumferential portions) between a rack teeth-side portion 22 and a back face-side portion 23 in the bush main body 16. The two axial grooves 25 provided at the boundaries 26 in the second modified embodiment are first axial grooves 28 extending from an end portion 16C-side toward an end portion 16D in the bush main body 16. The two axial grooves 25 may be both second axial grooves 29 extending from the end portion 16D-side toward the end portion 16C, or may extend in directions opposite to each other.

The remaining one axial groove 25 is a through hole 31 extending through the rack teeth-side portion 22 in an axial direction X. In the bush main body 16, the through hole 31 is formed at the same position as the position of the rack teeth 15 in the circumferential direction C. A plurality of axial grooves 25 that does not extend through the rack teeth-side portion 22 in the axial direction X may be further provided in a portion between each boundary 26 and the through hole 31 in the circumferential direction C. In this case, it is possible to further reduce a rigidity of the rack teeth-side portion 22.

Referring to FIG. 8, in a bush main body 16 in the third modified embodiment, only one through hole 31 is formed as an axial groove 25. In the bush main body 16, the through hole 31 is formed at the same position as the position of rack teeth 15 in a circumferential direction C. In the case where the axial groove 25 extends through a rack teeth-side portion 22 in an axial direction X as in a rack bush 10 in each of the second modified embodiment and the third modified embodiment, it is possible to reduce a rigidity of the rack teeth-side portion 22.

Furthermore, in the third modified embodiment, only one through hole 31 is formed as a rigidity reducing portion 18 in the rack teeth-side portion 22. In this case, the bush main body 16 has a substantially annular shape (a C-shape) in which one circumferential portion is cut out. Thus, it is possible to easily provide the rigidity reducing portion 18 in the rack teeth-side portion 22, only by providing the one axial groove 25. This invention is not limited to the above-described embodiments, and various modifications may be made in a scope described in claims.

For example, the number of the axial grooves 25 provided in the rack teeth-side portion 22 may be larger than five, or smaller than four. In short, the number of the axial grooves 25 is not particularly limited, as long as the axial grooves 25 function, as a whole, as the rigidity reducing portion 18 that makes the rigidity of the rack teeth-side portion 22 lower than the rigidity of the back face-side portion 23. Furthermore, the rigidity reducing portion 18 may be constituted by grooves that do not extend along the axial direction X. For example, the rigidity reducing portion 18 may extend from the end portion 16C toward the end portion 16D of the bush main body 16 while tilting to one side in the circumferential direction C.

Furthermore, the two axial grooves 25 adjacent to each other in the circumferential direction C do not necessarily need to extend from the sides opposite to each other in the axial direction X, and may extend from the same side. Specifically, the first axial groove 28 does not necessarily need to be provided adjacent to the second axial groove 29, and the first axial grooves 28 may be provided adjacent to each other (this also applies to the second axial grooves 29).

Furthermore, in the rack teeth-side portion 22, a region where the first axial grooves 28 are provided and a region where the second axial grooves 29 are provided may be separated from each other in the circumferential direction C. Furthermore, the bush main body 16 does not necessarily need to have a cylindrical shape, and may have any annular shape. The bush main body 16 is not limited to a particular bush main body, as long as the bush main body 16 is interposed between the housing 9 and the rack shaft 8 and supports the rack shaft 8 in which the rack teeth 15 are formed.

Furthermore, the boundaries 26 at the two portions do not necessarily need to be the positions that face each other in the radial direction R so as to be parallel to the rack teeth 15. The rack teeth-side portion 22 may be larger than the back face-side portion 23 or the rack teeth-side portion 22 may be smaller than the back face-side portion 23. In the embodiment, the rack bush 10 includes the elastic members 20. However, the rack bush 10 does not need to include the elastic members 20. In this case, in the state where the rack bush 10 is attached to the steering system 1, the rack bush 10 is pressed into the housing 9, and the outer peripheral surface 16A of the bush main body 16 contacts the inner peripheral surface 9C of the housing 9.

In the embodiment, the width w1 is equal to the width w2. However, the widths of the respective axial grooves 25 in the circumferential direction C do not necessarily need to be equal, and may be varied depending on the positions thereof. In the embodiment, the depth d1 is equal to the depth d2, and is larger than the half of the length L of the bush main body 16. However, the depths of the respective axial grooves 25 do not necessarily need to be equal, and may be varied depending on the positions thereof. Furthermore, the depth of each of the axial grooves 25 may be smaller than the half of the length L of the bush main body 16.

Thus, it is possible to adjust the rigidity of the rack teeth-side portion 22 in accordance with a shape, a position and a size of the rigidity reducing portion 18.

What is claimed is:

1. A rack bush constituting a rack and pinion type steering system and supporting a rack shaft in which rack teeth are formed at one circumferential portion, the rack hush comprising:
    an annular bush main body into which the rack shaft is inserted, and which is divided, in a circumferential direction, into two portions including a rack teeth-side portion located on the same side as the rack teeth in the circumferential direction and a back face-side portion other than the rack teeth-side portion; and
    a rigidity reducing portion that is provided in the rack teeth-side portion, and that makes a rigidity of the rack teeth-side portion lower than a rigidity of the back face-side portion,
    wherein the rigidity reducing portion includes an axial groove extending in an axial direction of the bush main body,
    the axial grooves are respectively provided at least at boundaries at two circumferential portions between the rack teeth-side portion and the hack face-side portion in the bush main body, and in a region other than the boundaries in the rack teeth-side portion, each of the axial grooves extends from a first end or a second end, which is located at an opposite side of the first end, of the rack teeth-side portion in the axial direction to an intermediate position in the rack teeth-side portion, and at least one axial groove extends from the first end of the rack teeth-side portion toward the second end of the rack teeth-side portion in the axial direction to the intermediate position in the rack teeth-side portion, and other axial grooves extend from the second end of the rack teeth-side portion toward the first end of the rack teeth-side portion in the axial direction to the intermediate position in the rack teeth-side portion.

2. The rack bush according to claim 1, wherein the boundaries at the two circumferential portions are positions that face each other in a radial direction of the bush main body so as to be parallel to the rack teeth.

3. The rack bush according to claim 2, wherein the two axial grooves provided at the boundaries at the two circumferential portions extend from the same side to the intermediate position in the rack teeth-side portion, or extend from sides opposite to each other to the intermediate positions in the rack teeth-side portion.

4. The rack bush according to claim 1, wherein the axial grooves are provided at the same position as a position of the rack teeth in the circumferential direction, and extend through the rack teeth-side portion in the axial direction.

5. The rack bush according to claim 1, wherein in the back face-side portion, a plurality of holes is formed in an inner peripheral surface of the bush main body.

6. The rack bush according to claim 1, wherein the at least one axial groove and the other axial grooves are alternatively arranged in the circumferential direction.

* * * * *